United States Patent
Kwak et al.

(10) Patent No.: US 8,416,815 B2
(45) Date of Patent: *Apr. 9, 2013

(54) METHOD OF TRANSMITTING UPLINK CONTROL SIGNALS IN WIRELESS COMMUNICATION SYSTEM

(75) Inventors: Jin Sam Kwak, Anyang-si (KR); Hong Won Park, Anyang-si (KR); Seung Hee Han, Anyang-si (KR); Min Seok Noh, Anyang-si (KR); Yeong Hyeon Kwon, Anyang-si (KR); Hyun Woo Lee, Anyang-si (KR); Dong Cheol Kim, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 276 days.

This patent is subject to a terminal disclaimer.

(21) Appl. No.: 12/941,921

(22) Filed: Nov. 8, 2010

(65) Prior Publication Data

US 2011/0051680 A1    Mar. 3, 2011

Related U.S. Application Data

(63) Continuation of application No. 12/594,159, filed as application No. PCT/KR2008/004590 on Aug. 7, 2008, now Pat. No. 7,852, 883.

(60) Provisional application No. 60/954,812, filed on Aug. 8, 2007, provisional application No. 60/979,860, filed on Oct. 14, 2007.

(30) Foreign Application Priority Data

Dec. 7, 2007    (KR) .......................... 10-2007-0127014

(51) Int. Cl.
    *H04B 7/26*    (2006.01)

(52) U.S. Cl. ....................................................... 370/522
(58) Field of Classification Search .................... 370/522
     See application file for complete search history.

(56) References Cited

U.S. PATENT DOCUMENTS 7,852,883 B2 * 12/2010 Kwak et al. .................. 370/522
2007/0133458 A1    6/2007 Chandra et al.
(Continued)

FOREIGN PATENT DOCUMENTS

KR    10-2007-0074431 A    7/2007
KR    10-2008-0073616 A    8/2008
(Continued)

OTHER PUBLICATIONS

Alcatel-Lucent: "Multiplexing the Scheduling Request in the Uplink" ; 5.13.2 UL Control Signaling; 3GPP TSG-RAN WG1 #49bis; R1-073066; Orlando U.S., Jun. 25-29, 2007; XP050106721.
Nokia Siemens Networks, Nokia; Multiplexing of Scheduling Request and ACK/NACK and/or CQI; 3GPP TSG RAN WG1 #49bis; R1-073001; 5.13.2; Orlando, U.S.A., Jun. 25-29, 2007; XP050106675.

(Continued)

*Primary Examiner* — Melvin Marcelo
(74) *Attorney, Agent, or Firm* — Birch, Stewart, Kolasch & Birch, LLP

(57) ABSTRACT

A method and device for transmitting uplink control signals in a wireless communication system, the method including: reserving a preassigned scheduling request (SR) physical uplink control channel (PUCCH) resource used for transmission of a SR; determining a frequency domain sequence and an orthogonal sequence based on the preassigned SR PUCCH resource; spreading an ACK/NACK for Hybrid Automatic Repeat Request (HARQ) with the frequency domain sequence and the orthogonal sequence to generate a mapped sequence; and transmitting the mapped sequence.

8 Claims, 17 Drawing Sheets

U.S. PATENT DOCUMENTS

| | | |
|---|---|---|
| 2007/0171849 A1 | 7/2007 | Zhang et al. |
| 2007/0201397 A1 | 8/2007 | Zhang |
| 2009/0109917 A1 | 4/2009 | Pajukoski et al. |
| 2010/0195629 A1 | 8/2010 | Chen et al. |

FOREIGN PATENT DOCUMENTS

| | | |
|---|---|---|
| WO | WO-2007/078171 A2 | 7/2007 |
| WO | WO-2009/008677 A2 | 1/2009 |

OTHER PUBLICATIONS

Ericsson: 'Detail of ACK/NAK bundling for TDD'; TSG-RAN WG1 #53; R1-082002; 7.1.2; Kansas City, MO, U.S.A., May 5-9, 2008; XP050110349.

R1-070777, "E-UTRA Multiplexing of UL Control Signaling with Data," Motorola, RAN1#48, St. Louis, USA, Feb. 2007.

R1-070162, "EUTRA UL L1/L2 Control Channel Mapping," Motorola, RAN1#47bis, Sorrento, Italy, Jan. 2007.

Source: LG Electronics Inc., 3GPP TSG RAN WGI #51; "Scheduling Request (SR) interaction with PUCCH"; Agenda Item: 6.2.4; Document for: Discussion and Decision; Jeju, Korea; Nov. 5-9, 2007; R1-074739.

Alcatel-Lucent, "Multiplexing Method for Uplink Non-Data-Associated Control Signals," 3GPP TSG-RAN WG1 #49, Kobe, Japan, May 7-11, 2007, R1-072399 (Revised from R1-071719), pp. 1-4.

Nokia Siemens Networks, Nokia, "Uplink Scheduling Request for LTE," 3GPP TSG RAN WG1 #49, Kobe, Japan, May 7-11, 2007, R1-072307, 2 pages.

\* cited by examiner

METHOD OF TRANSMITTING UPLINK CONTROL SIGNALS IN WIRELESS COMMUNICATION SYSTEM

CROSS-REFERENCE TO RELATED APPLICATIONS

This application is a continuation of U.S. application Ser. No. 12/594,159 filed on Sep. 30, 2009 now U.S. Pat. No. 7,852,883, which is the National Phase of PCT/KR2008/004590 filed on Aug. 7, 2008, which claims priority under 35 U.S.C. 119(e) to U.S. Provisional Application Ser. Nos. 60/954,812 filed on Aug. 8, 2007 and 60/979,860 filed on Oct. 14, 2007, and under 35 U.S.C. 119(a) to Patent Application No. 10-2007-0127014 filed in Korea on Dec. 7, 2007, all of which are hereby expressly incorporated by reference into the present application.

TECHNICAL FIELD

The present invention relates to wireless communications, and more particularly, to a method of transmitting uplink control signals in a wireless communication system.

BACKGROUND ART

In order to maximize efficiency of a limited radio resource in a wideband wireless communication system, methods for more effectively transmitting data in time, spatial, and frequency domains have been provided.

Orthogonal frequency division multiplexing (OFDM) uses a plurality of orthogonal subcarriers. Further, the OFDM uses an orthogonality between inverse fast Fourier transform (IFFT) and fast Fourier transform (FFT). A transmitter transmits data by performing IFFT. A receiver restores original data by performing FFT on a received signal. The transmitter uses IFFT to combine the plurality of subcarriers, and the receiver uses FFT to split the plurality of subcarriers. According to the OFDM, complexity of the receiver can be reduced in a frequency selective fading environment of a broadband channel, and spectral efficiency can be increased when selective scheduling is performed in a frequency domain by using a channel characteristic which is different from one subcarrier to another. Orthogonal frequency division multiple access (OFDMA) is an OFDM-based multiple access scheme. According to the OFDMA, efficiency of radio resources can be increased by allocating different subcarriers to multiple users.

To maximize efficiency in the spatial domain, the OFDM/OFDMA-based system uses a multiple-antenna technique which is used as a suitable technique for high-speed multimedia data transmission by generating a plurality of time/frequency domains in the spatial domain. The OFDM/OFDMA-based system also uses a channel coding scheme for effective use of resources in the time domain, a scheduling scheme which uses a channel selective characteristic of a plurality of users, a hybrid automatic repeat request (HARQ) scheme suitable for packet data transmission, etc.

In order to implement various transmission or reception methods to achieve high-speed packet transmission, transmission of a control signal on the time, spatial, and frequency domains is an essential and indispensable factor. A channel for transmitting the control signal is referred to as a control channel. An uplink control signal may be various such as an acknowledgement (ACK)/negative-acknowledgement (NACK) signal as a response for downlink data transmission, a channel quality indicator (CQI) indicating downlink channel quality, a precoding matrix index (PMI), a rank indicator (RI), etc.

One example of the uplink control signal is a scheduling request. The scheduling request is used when a user equipment (UE) requests a base station (BS) to allocate an uplink radio resource. The scheduling request is a sort of preliminary information exchange for data exchange. In order for the UE to transmit uplink data to the BS, radio resource allocation is first requested by using the scheduling request. When the BS allocates the uplink radio resource in response to the scheduling request, the HE transmits the uplink data by using the allocated radio resource.

Compatibility with another control channel for transmitting another control signal has to be taken into consideration when the scheduling request needs to be transmitted on an uplink control channel. UE capacity capable of transmitting the scheduling request has to be also taken into consideration. A case where the scheduling request is transmitted simultaneously with other control signals has to be also taken into consideration. For example, the scheduling request and ACK/NACK signals may be simultaneously transmitted by one UE.

Accordingly, there is a need for a control channel having an effective structure for simultaneously transmitting a scheduling request and other control signals.

Technical Problem

The present invention provides a method of transmitting a plurality of multiplexed uplink control signals.

The present invention also provides a method of transmitting a scheduling request for requesting uplink radio resource allocation together with other control signals through one uplink control channel.

Technical Solution

In an aspect, a method of transmitting uplink control signals in a wireless communication system is provided. The method includes preparing a scheduling request resource for transmitting a scheduling request on an uplink control channel in one subframe, a subframe comprising two slots, a slot comprising a plurality of single carrier-frequency division multiple access (SC-FDMA) symbols, the scheduling request being used to request a radio resource for uplink transmission, wherein a positive transmission of the scheduling request is carried by presence of its transmission on the uplink control channel and a negative transmission of the scheduling request is carried by absence of its transmission on the uplink control channel, preparing an ACK/NACK resource for transmitting an ACK/NACK signal for hybrid automatic repeat request (HARQ) of downlink data on the uplink control channel in one subframe, and when both the ACK/NACK signal and the scheduling request are transmitted in same subframe, transmitting the ACK/NACK signal on the uplink control channel which is configured by the scheduling request resource for the positive transmission of the scheduling request and transmitting the ACK/NACK signal on the uplink control channel which is configured by the ACK/NACK resource for the negative transmission of the scheduling request.

The uplink control channel may be configured by dividing the plurality of SC-FDMA symbols in the slot into a first set of SC-FDMA symbols and a second set of SC-FDMA symbols, spreading a control signal with each of first frequency domain sequences, the first frequency domain sequences being generated by cyclic shifts of a base sequence, wherein the control signal corresponds to the scheduling request or the ACK/NACK signal, mapping the spread control signals to each SC-FDMA symbol in the first set, mapping each of second frequency domain sequences to each SC-FDMA symbol in the second set, the second frequency domain sequence being generated by cyclic shifts of the base sequence, spreading the mapped control signals in the first set with a first orthogonal sequence, the first orthogonal sequence having a length equal to the number of SC-FDMA symbols in the first set, and spreading the mapped second frequency domain sequences in the second set with a second orthogonal sequence, the second orthogonal sequence having a length equal to the number of SC-FDMA symbols in the second set.

In another aspect, a method of transmitting uplink control signals in a wireless communication system is provided. The method includes preparing a scheduling request resource for simultaneously transmitting a scheduling request and an ACK/NACK signal on an uplink control channel in a subframe, the subframe comprising two slots, a slot comprising a plurality of SC-FDMA symbols, the scheduling request being used to request a radio resource for uplink transmission, and transmitting the ACK/NACK signal and the scheduling request on the uplink control channel which is configured by the scheduling request resource when both the ACK/NACK signal and the scheduling request are transmitted in the subframe.

In still another aspect, a method of transmitting uplink control signals in a wireless communication system is provided. Both an ACK/NACK signal and a scheduling request may be transmitted in same subframe. The method includes preparing a ACK/NACK resource for transmitting the ACK/NACK signal for HARQ of downlink data on an uplink control channel, preparing a scheduling request resource for transmitting a scheduling request and the ACK/NACK signal on the uplink control channel in one subframe, the one subframe comprising two slots, a slot comprising a plurality of SC-FDMA symbols, the scheduling request being used to request a radio resource for uplink transmission, wherein a positive transmission of the scheduling request is carried by presence of its transmission on the uplink control channel and a negative transmission of the scheduling request is carried by absence of its transmission on the uplink control channel, and transmitting the ACK/NACK signal on the uplink control channel configured by the scheduling request resource for the positive transmission of the scheduling request and transmitting the ACK/NACK signal on the uplink control channel configured by the ACK/NACK resource for negative transmission of the scheduling request.

Advantageous Effects

A scheduling request and an acknowledgment (ACK)/negative-acknowledgement (NACK) signal can be simultaneously transmitted in the same subframe without interference with other control channels. Even when the scheduling request is simultaneously transmitted with other control signals, there is no performance deterioration in detection of the control signals. The scheduling request can be transmitted while minimizing decrease in capability of the control channels.

MODE FOR INVENTION

Figure 1:
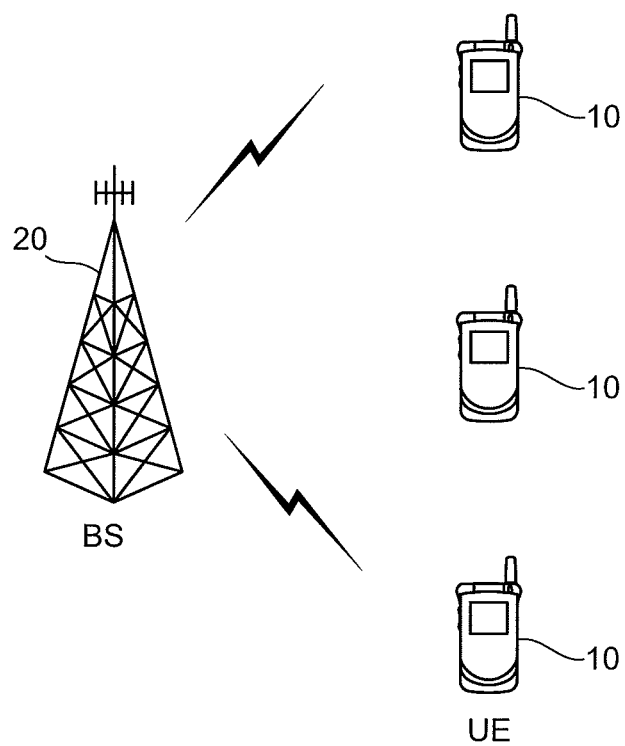
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

Hereinafter, a downlink is defined as a communication link from the BS 20 to the UE 10, and an uplink is defined as a communication link from the UE 10 to the BS 20. In the downlink, a transmitter may be a part of the BS 20, and a receiver may be a part of the UE 10. In the uplink, the transmitter may be a part of the UE 10, and the receiver may be a part of the BS 20.

Figure 2:
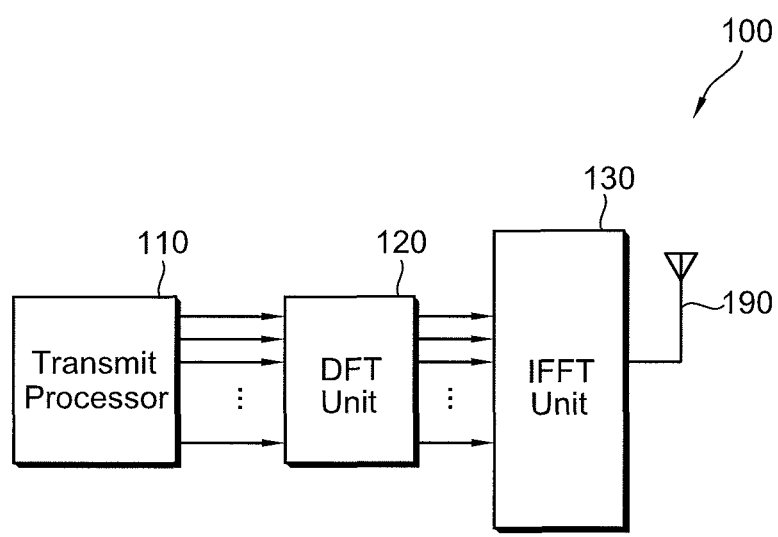
FIG. 2 is a block diagram showing a transmitter according to an embodiment of the present invention.

FIG. 2 is a block diagram showing a transmitter according to an embodiment of the present invention.

Referring to FIG. 2, a transmitter 100 includes a transmit (Tx) processor 110, a discrete Fourier transform (DFT) unit 120 that performs DFT, and an inverse fast Fourier transform (IFFT) unit 130 that performs IFFT. The DFT unit 120 performs DFT on data processed by the Tx processor 110 and outputs a frequency domain symbol. The data input to the DFT unit 120 may be a control signal and/or user data. The IFFT unit 130 performs IFFT on the received frequency domain symbol and outputs a Tx signal. The Tx signal is a time domain signal and is transmitted through a Tx antenna 190. A time domain symbol output from the IFFT unit 130 is referred to as an orthogonal frequency division multiplexing (OFDM) symbol. Since IFFT is performed after DFT spreading, the time domain symbol output from the IFFT unit 130 is also referred to as a single carrier-frequency division multiple access (SC-FDMA) symbol. SC-FDMA is a scheme in which spreading is achieved by performing DFT at a previous stage of the IFFT unit 130 and is advantageous over the OFDM in terms of decreasing a peak-to-average power ratio (PAPR).

Although the SC-FDMA scheme is described herein, multiple access schemes used in the present invention are not limited thereto. For example, various multiple access schemes may be used such as code division multiple access (CDMA), time division multiple access (TDMA), frequency division multiple access (FDMA), single-carrier FDMA (SC-FDMA), orthogonal frequency division multiple access (OFDMA), etc.

Different multiple access schemes may be used for uplink and downlink in the wireless communication system. For example, the SC-FDMA scheme may be used for uplink, and the OFDMA scheme may be used for downlink.

Figure 3:
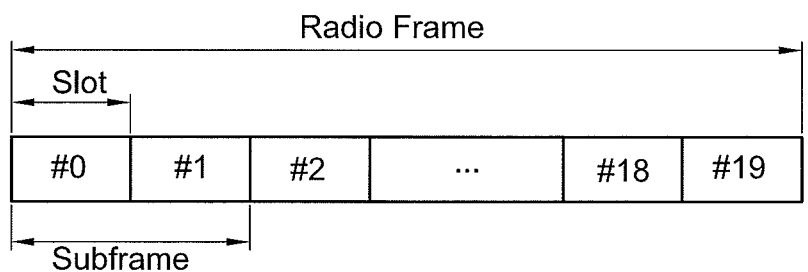
FIG. 3 shows an exemplary structure of a radio frame.

FIG. 3 shows an exemplary structure of a radio frame.

Referring to FIG. 3, the radio frame includes 10 subframes. One subframe can include two slots. One slot can include a plurality of OFDM symbols in a time domain and at least one subcarrier in a frequency domain. The slot is a unit of radio resource allocation in the time domain. For example, one slot can include 7 or 6 OFDM symbols.

The radio frame structure is shown for exemplary purposes only, and thus the number of subframes included in the radio frame or the number of slots included in the subframe or the number of OFDM symbols included in the slot is not limited thereto.

Figure 4:
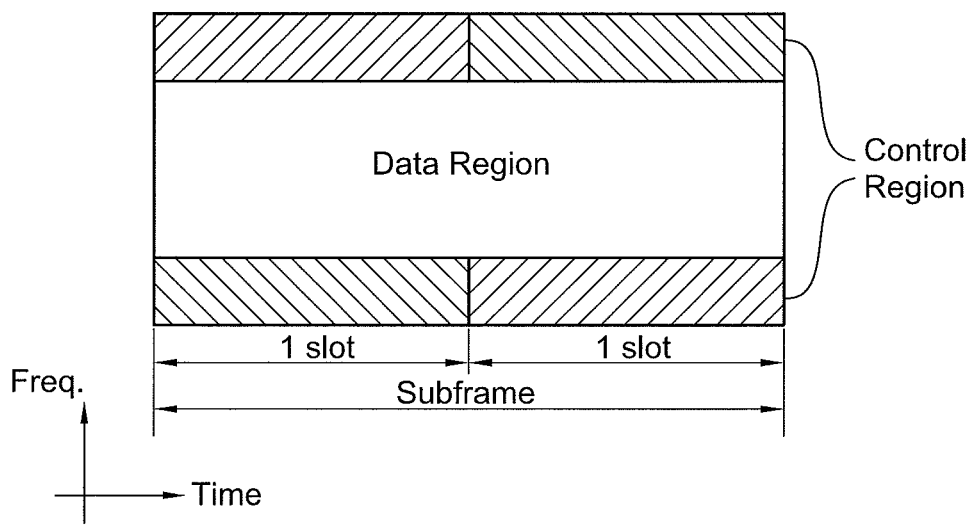
FIG. 4 shows an exemplary subframe.

FIG. 4 shows an exemplary subframe. The subframe may be an uplink subframe using SC-FDMA.

Referring to FIG. 4, the uplink subframe can be divided into two parts, that is, a control region and a data region. Since the control region and the data region use different frequency bands, frequency division multiplexing (FDM) have been achieved.

The control region is used to transmit only a control signal and is generally assigned to a control channel. The data region is used to transmit data and is generally assigned to a data channel. An uplink control channel assigned to the control region is referred to as a physical uplink control channel (PUCCH). An uplink data channel assigned to the data region is referred to as a physical uplink shared channel (PUSCH). The control channel transmits the control signal. The data channel transmits the user data. The control signal includes a plurality of signals other than the user data. That is, the control signal includes an acknowledgement (ACK)/negative-acknowledgement (NACK) signal, a channel quality indicator (CQI), a precoding matrix index (PMI), a rank indicator (RI), a scheduling request, etc.

Only the control signal is carried on the control region. The user data and the control signal can be carried together on the data region. That is, when a UE transmits only the control signal, the control region can be assigned to transmit the control signal. In addition, when the UE transmits both the data and the control signal, the data region can be assigned to transmit the data and the control signal. In an exceptional case, even if only the control signal is transmitted, the control signal may be transmitted in a large amount or the control signal may be not suitable to be transmitted through the control region. In this case, a radio resource can be assigned to the data region to transmit the control signal.

To maintain a single carrier property, the UE cannot simultaneously transmit the PUSCH and the PUCCH. This also means that one UE cannot simultaneously transmit two different PUCCHs in the same subframe.

Two slots within a subframe is frequency hopped. That is, a first slot of the two slots is assigned to a first frequency band, and a second slot thereof is assigned to a second frequency band. By using different subcarriers in the two slots, a frequency diversity gain can be obtained.

For clarity, it is assumed hereinafter that one slot consists of 7 OFDM symbols, and thus one subframe including two slots consists of 14 OFDM symbols in total. The number of OFDM symbols included in one subframe or the number of OFDM symbols included in one slot is for exemplary purposes only, and technical features of the present invention are not limited thereto.

Figure 5:
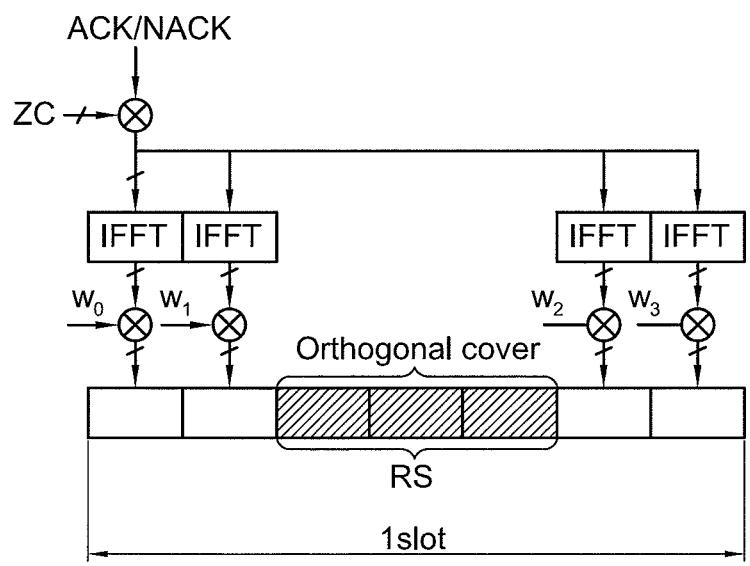
FIG. 5 shows a structure of an acknowledgement (ACK)/negative-acknowledgement (NACK) channel.

FIG. 5 shows a structure of an ACK/NACK channel. The ACK/NACK channel is a control channel through which an ACK/NACK signal is transmitted to perform hybrid automatic repeat request (HARQ) of downlink data. The ACK/NACK signal is a transmission and/or reception confirm signal for the downlink data.

Referring to FIG. 5, among 7 OFDM symbols included in one slot, a reference signal (RS) is carried on three consecutive OFDM symbols in the middle portion of the slot and the ACK/NACK signal is carried on the remaining four OFDM symbols. The RS is carried on three contiguous OFDM symbols located in the middle portion of the slot. The location and the number of symbols used in the RS may vary depending on a control channel. Changes in the location and the number the symbols may result in changes in those symbols used in the ACK/NACK signal.

When the control signal is transmitted within an assigned band, frequency domain spreading and time domain spreading are simultaneously used to increase the number of multiplexable UEs and the number of control channels. A frequency domain sequence is used as a base sequence to spread the ACK/NACK signal on a frequency domain. A Zadoff-Chu (ZC) sequence is one of constant amplitude zero auto-correlation (CAZAC) sequences and can be used as the frequency domain sequence.

A k-th element of a ZC sequence having an index of M can be expressed as shown:

[Math Figure 1]
$$c(k) = \exp\left\{-\frac{j\pi Mk(k+1)}{N}\right\}, \text{ when } N \text{ is odd number}$$
$$c(k) = \exp\left\{-\frac{j\pi Mk^2}{N}\right\}, \text{ when } N \text{ is even number}$$

where N denotes a length of the ZC sequence. An index M is a natural number equal to or less than N. M and N are relatively prime to each other.

Control channels can be identified by using base sequences having different cyclic shift values. The number of available cyclic shifts may vary according to channel delay spread.

After being subjected to frequency domain spreading, the ACK/NACK signal is subjected to IFFT processing and is then spread again in a time domain by using a time domain sequence. The ACK/NACK signal is spread using four orthogonal sequences w0, w1, w2, and w3 for four OFDM symbols. The RS is also spread using an orthogonal sequence having a length of 3. This is called orthogonal covering.

To configure the ACK/NACK channel, the plurality of SC-FDMA symbols in the slot are divided into a first set of SC-FDMA symbols (a SC-FDMA symbol set for the ACK/NACK signal) and a second set of SC-FDMA symbols (a SC-FDMA symbol set for a RS). The ACK/NACK signal is spread with each of first frequency domain sequences which is generated by cyclic shifts of a base sequence, and mapped to each SC-FDMA symbol in the first set. Also, each of second frequency domain sequences which is generated by cyclic shifts of the base sequence is mapped to each SC-FDMA symbol in the second set. The mapped ACK/NACK signal is spread with a first orthogonal sequence which has the length equal to the number of SC-FDMA symbols in the first set. Finally, the ACK/NACK channel is configured by spreading the mapped second frequency domain sequences in the second set with a second orthogonal sequence which has the length equal to the number of SC-FDMA symbols in the second set.

Now, a method of generating a scheduling request channel for transmitting a scheduling request (SR) will be described.

The SR is used when a UE request a BS to allocate an uplink radio resource. The SR is a sort of preliminary information exchange for data exchange. In order for the UE to transmit uplink data to the BS, a radio resource needs to be allocated using the SR. When the UE transmits the SR, the BS allocates the radio resource for uplink data transmission and informs the UE of the radio resource allocation. The BS has to only recognize a presence/absence of the SR. Therefore, a positive transmission of the SR can be achieved with the presence of transmission of the SR, and a negative transmission of the SR can be achieved with the absence of transmission of the SR.

A control channel such as an ACK/NACK channel needs to be considered along with transmission of the SR. If the ACK/NACK channel and the scheduling request channel are separately configured, the UE cannot transmit two channels in order to maintain the single carrier property. Therefore, there is a problem in that the LTE cannot simultaneously transmit the SR and the ACK/NACK signal. This is because transmission is made by selecting one of the scheduling request channel and the ACK/NACK channel in order to maintain the single carrier property. However, it is difficult to clearly distinguish priorities for selecting the SR and other control signals. For example, the ACK/NACK signal has a direct effect on a downlink throughput. In this case, transmission of the ACK/NACK signal may be delayed due to the SR, which may cause deterioration in resource efficiency.

In addition, even if an additional control channel for simultaneously transmitting the SR and the ACK/NACK signal is defined, limited control channel resources may be wasted as a result. This is because resources for a new control channel needs to be reserved in addition to the scheduling request channel and the ACK/NACK channel.

Therefore, there is a need for a method whereby the UE can simultaneously transmit the SR and the ACK/NACK signal in an effective manner.

Hereinafter, a configuration of an effective scheduling request channel for transmitting a SR in an ACK/NACK channel configured using time-frequency domain spreading will be described. To simultaneously transmit the SR and other control signals, the channel has to be configured to satisfy the following requirements.

(1) Compatibility with the ACK/NACK channel (or other control channels) is possible.

(2) The same channel structure is used even when only the SR is transmitted.

(3) Capability of the existing ACK/NACK channel is maintained when only the ACK/NACK signal is transmitted.

(4) Channel capability is maximized when the SR and the ACK/NACK signal is simultaneously transmitted.

(5) The same channel configuration is achieved irrespective of whether the ACK/NACK signal and the SR are simultaneously transmitted.

(6) Configuration of the ACK/NACK channel and configuration of the scheduling request channel are flexible in an assigned time-frequency resource.

(7) Flexibility of sequence allocation is increased when a dedicated scheduling request channel is configured through sequence allocation.

(8) Transmission of the ACK/NACK signal and the SR is possible when a minimum frequency resource supportable in a narrow band is allocated.

(9) Performance deterioration does not occur when the ACK/NACK signal is detected after detecting the SR.

(10) The same scheduling request detection scheme is used irrespective of a presence/absence of the ACK/NACK signal.

(11) Transmission of other control signals (e.g., the ACK/NACK signal, etc.) is possible along with transmission of the SR. In this case, transmission of the existing control signal is not limited.

To configure the scheduling request channel by considering the above requirements, configuration using sequence allocation is proposed. In addition, a scheduling request channel using coherent detection or non-coherent detection is proposed. In addition, a scheduling request channel using frequency hopping is proposed.

Although the ACK/NACK signal will be described hereinafter, the scheduling request channel can also be used for other control signals.

When using the ACK/NACK channel, in a frequency domain, spreading is performed using a frequency domain sequence. In a time domain, spreading is performed using an orthogonal sequence having a length of 4 for the ACK/NACK signal or an orthogonal sequence having a length of 3 for a reference signal. If one resource block consists of 12 subcarriers, for one resource block, a ZC sequence having a length of 12 can be used in the frequency domain. Supportable UE capacity is determined by the length (i.e., 3) of the reference signal for coherent detection and the number of maximum cyclic shifts. Thus, if four cyclic shifts are possible, control channel capability is 6×3=18.

To transmit the SR, the scheduling request channel can be configured by reserving a two-dimensional spreading sequence in the ACK/NACK channel. In case of configuring the dedicated scheduling request channel, the SR can be detected using non-coherent detection irrespective of whether the ACK/NACK signal is detected. In case of simultaneously transmitting the SR and the ACK/NACK signal, the BS knows that the SR and the ACK/NACK signal are simultaneously transmitted. Thus, there is no need to detect the SR with respect to all ACK/NACK channels. The BS detects the SR only when the SR and the ACK/NACK signal are simultaneously transmitted.

A sequence assignment method for configuring the scheduling request channel is as follows.

(1) In a frequency domain sequence assigned to the ACK/NACK channel, one or more orthogonal sequences can be assigned to transmit the SR. For example, one cyclic shift in a base sequence can be assigned to transmit the SR.

(2) One or more time domain sequences assigned to the ACK/NACK channel can be assigned to transmit the SR.

(3) In a time-frequency two-dimensional spreading sequence to be assigned to the ACK/NACK, one or more orthogonal sequences are assigned to transmit the SR.

Regarding a control channel structure using sequence hopping, the aforementioned three sequence assignment method can be extended to a spreading hopping pattern defined with respect to one or more symbols.

According to whether the reference signal is used to detect the SR, there are scheduling request channel conforming to coherent detection and a scheduling request channel conforming to non-coherent detection. The scheduling request channel can be applied to any control channels using spreading sequences. The following descriptions will be explained by considering the ACK/NACK channel.

Figure 6:
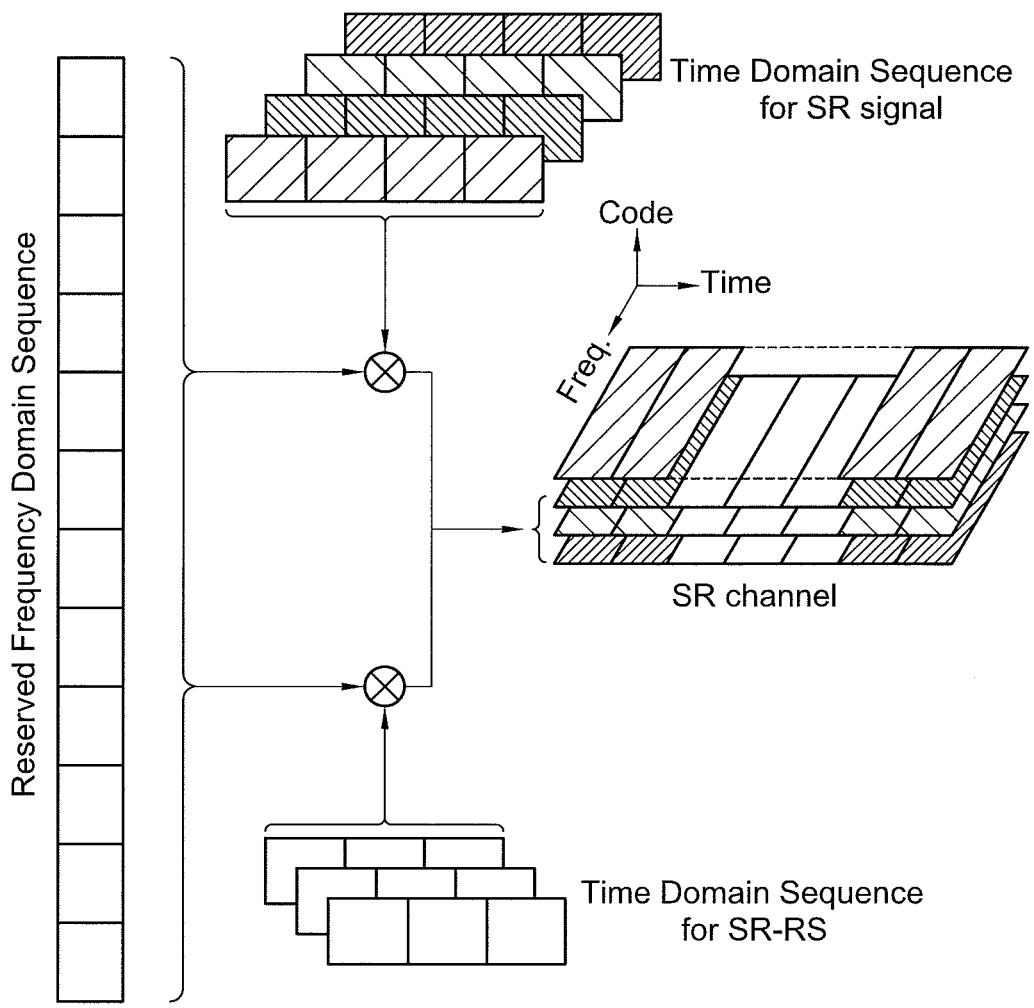
FIG. 6 shows an example of a configuration of a scheduling request channel for coherent detection according to an embodiment of the present invention.

FIG. 6 shows an example of a configuration of a scheduling request channel for coherent detection according to an embodiment of the present invention.

Referring to FIG. 6, at least one of frequency domain sequences assigned to an ACK/NACK channel is reserved with a scheduling request resource for transmission of a SR. A ZC sequence may be used as a base sequence for frequency domain sequences. One cyclic shift may be reserved with the scheduling request resource for transmission of the SR. Information on the scheduling request resource may be predetermined between a BS and a UE or may be reported by the BS to the UE.

For compatibility with the existing ACK/NACK channel structure, the scheduling request channel is configured by allowing the SR to use a time domain sequence having a length of 4 and by allowing a reference signal (RS) for the SR to use a time domain sequence having a length of 3. The reference signal for the SR will be simply referred to as "SR-RS".

A dedicated SR-RS may be used in the scheduling request channel. In this case, even if a length of a time domain sequence used to transmit the SR is greater than a length of a time domain sequence used to transmit the SR-RS, the number of supportable scheduling request channels is determined by the length of the time domain sequence used for the SR-RS.

A time-frequency domain sequence used for the ACK/NACK channel may be utilized to configure the scheduling request channel. In this case, channel capability differs depending on assignment of a frequency domain sequence. It is assumed that six orthogonal sequences can be generated for one base sequence through cyclic shifts in the ACK/NACK channel. If at least one cyclic shift is assigned with a scheduling request resource, the number of supportable scheduling request channels is (a length of a time domain sequence used in SR-RS)×(the number of reserved cyclic shifts). Therefore, when one cyclic shift is assigned to transmit the SR, three scheduling request channels can be generated. In this case, the number ACK/NACK channels decreases by 3.

Table 1 shows the number of scheduling request channels and the number of ACK/NACK channels according to the number of reserved frequency domain sequences.

TABLE 1

| The number of reserved frequency domain sequence | The number of SR channels with SR-RS | The number of ACK/NACK channels |
| --- | --- | --- |
| 0 | 0 | 18 |
| 1 | 3 | 15 |
| 2 | 6 | 12 |

TABLE 1-continued

| The number of reserved frequency domain sequence | The number of SR channels with SR-RS | The number of ACK/NACK channels |
| --- | --- | --- |
| ... | ... | ... |
| 6 | 18 | 0 |

The UE transmits a scheduling request channel through reserved frequency domain spreading and time domain spreading. Upon receiving the scheduling request channel, the BS can detect the SR by using coherent detection or non-coherent detection. Since orthogonality is maintained between the SR and the ACK/NACK signal, the BS can detect the SR and the ACK/NACK signal. The BS can detect the SR by using non-coherent detection and detect the ACK/NACK signal by using coherent detection.

Figure 7:
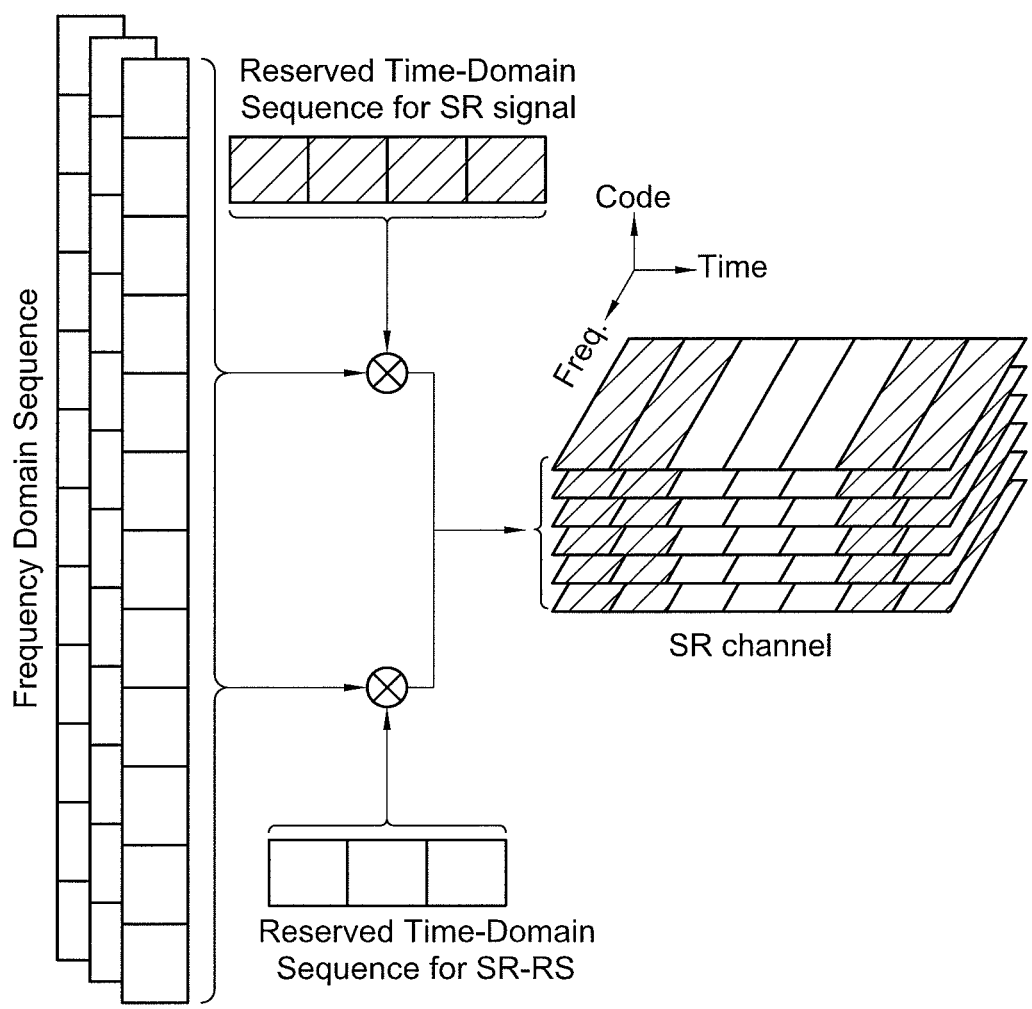
FIG. 7 shows an example of a configuration of a scheduling request channel for coherent detection according to another embodiment of the present invention.

FIG. 7 shows an example of a configuration of a scheduling request channel for coherent detection according to another embodiment of the present invention.

Referring to FIG. 7, at least one of time domain sequences assigned to an ACK/NACK channel is reserved with a scheduling request resource for transmission of a SR. For compatibility with the existing ACK/NACK channel structure, a time domain sequence having a length of 4 is reserved for the SR, and a time domain sequence having a length of 3 is reserved for a SR-RS. Information on the scheduling request resource may be predetermined between a BS and a UE or may be reported by the BS to the UE.

The number of supportable scheduling request channels is determined by the number of assigned time domain sequences and the number of frequency domain sequences. A time-frequency domain sequence used for the ACK/NACK channel may be utilized to configure the scheduling request channel. In this case, it is assumed that six orthogonal sequences can be generated for one base sequence through cyclic shifts. If one time domain sequence is assigned with a scheduling request resource, the number of supportable scheduling request channels is (the number of available cyclic shifts)×(the number of reserved time domain sequences). Therefore, when one time domain sequence is assigned to the scheduling request resource, six (i.e., 6×1=6) scheduling request channels can be generated. In this case, the number of ACK/NACK channels decreases by 6.

Table 2 shows the number of scheduling request channels and the number of ACK/NACK channels according to the number of reserved time domain sequences. Since the time domain sequence having a length of 3 is assigned for the SR-RS, the maximum number of time domain sequences assignable for transmission of the SR is 3.

TABLE 2

| The number of reserved time domain sequence | The number of SR channels with SR-RS | The number of ACK/NACK channels |
| --- | --- | --- |
| 0 | 0 | 18 |
| 1 | 6 | 12 |
| 2 | 12 | 6 |
| 3 | 18 | 0 |

The UE transmits a scheduling request channel through frequency domain spreading and reserved time domain spreading. Upon receiving the scheduling request channel, the BS can detect the SR by using coherent detection or non-coherent detection.

Even when the SR and the ACK/NACK signal are simultaneously transmitted, orthogonality is maintained between the SR and the ACK/NACK signal. Thus, the BS can detect the SR and the ACK/NACK signal. The BS can detect the SR by using non-coherent detection and detect the ACK/NACK signal by using coherent detection.

Figure 8:
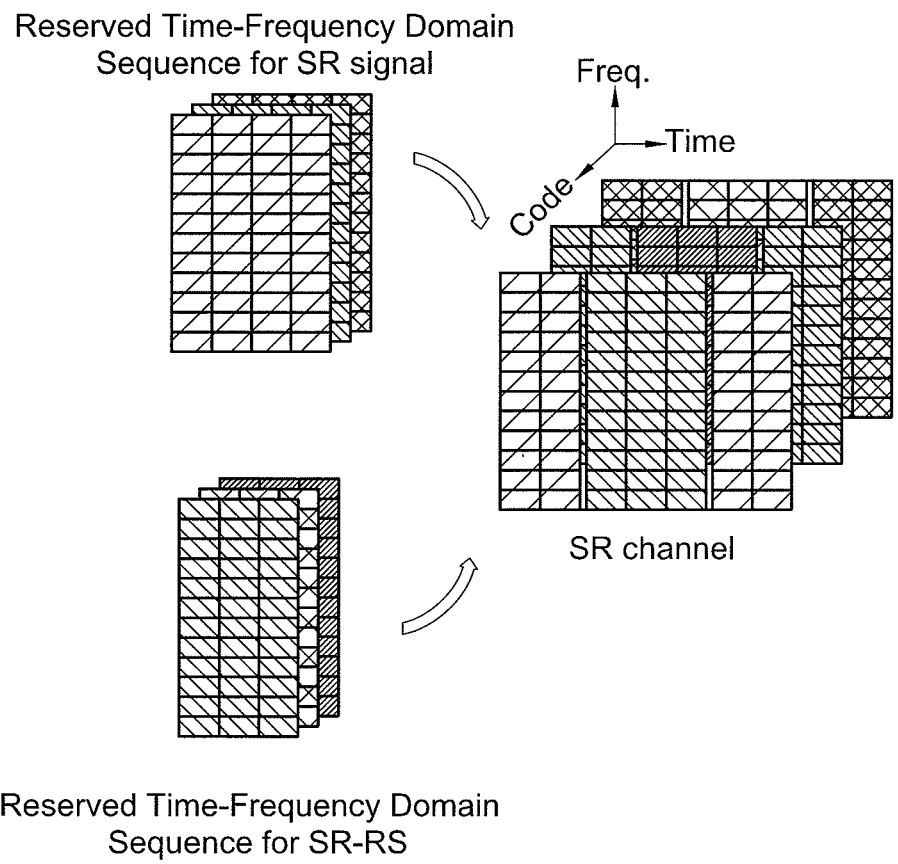
FIG. 8 shows an example of a configuration of a scheduling request channel for coherent detection according to another embodiment of the present invention.

FIG. 8 shows an example of a configuration of a scheduling request channel for coherent detection according to another embodiment of the present invention.

Referring to FIG. 8, a time domain sequence and a frequency domain sequence, each of which has a different length, are reserved for a SR and a SR-RS with a scheduling request resource. The scheduling request channel uses two-dimensional spreading in a time-frequency domain. Information on the scheduling request resource may be predetermined between a BS and a UE or may be reported by the BS to the UE.

The number of supportable scheduling request channel is one-to-one mapped to an assigned time-frequency domain sequence. A time-frequency domain sequence used for the ACK/NACK channel may be utilized to configure the scheduling request channel. In this case, it is assumed that six orthogonal sequences can be generated for one base sequence through cyclic shifts. The SR uses a time domain sequence having a length of 4. The SR-RS uses a time domain sequence having a length of 3. Thus, the maximum number of available scheduling request channels is 6×3=18. The scheduling request channel can be generated by assigning one time domain sequence to the SR.

Table 3 shows the number of scheduling request channels and the number of ACK/NACK channels according to the number of assigned time-frequency domain sequences.

TABLE 3

| The number of reserved time-frequency domain sequence | The number of SR channels with SR-RS | The number of ACK/NACK channels |
|---|---|---|
| 0 | 0 | 18 |
| 1 | 1 | 17 |
| ... | ... | ... |
| 18 | 18 | 0 |

The UE transmits a scheduling request channel by using two-dimensional spreading.

Upon receiving the scheduling request channel, the BS can detect the SR by using coherent detection or non-coherent detection.

Even when the SR and the ACK/NACK signal are simultaneously transmitted, orthogonality is maintained between the SR and the ACK/NACK signal. Thus, the BS can detect the SR and the ACK/NACK signal. The BS can detect the SR by using non-coherent detection and detect the ACK/NACK signal by using coherent detection.

Figure 9:
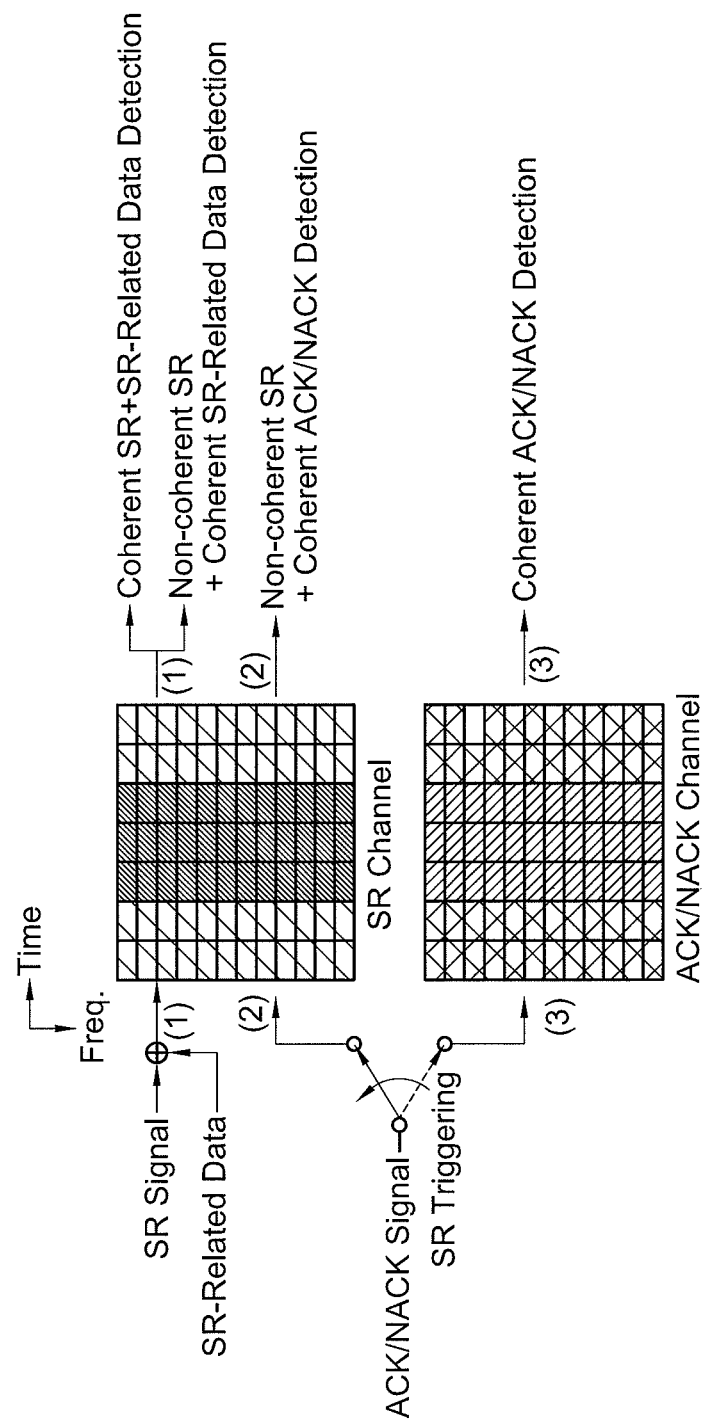
FIG. 9 shows an example of transmission of a scheduling request.

FIG. 9 shows an example of transmission of a SR.

Referring to FIG. 9, a path (1) denotes transmission of the SR. A path (2) denotes transmission of the SR and an ACK/NACK signal. A path (3) denotes transmission of the ACK/NACK signal.

In the path (1), if only the SR is transmitted on a scheduling request channel, the SR is transmitted on the scheduling request channel assigned with a scheduling request resource. The scheduling request resource can be regarded as a resource for the SR. When considering the path (2), the scheduling request resource can be regarded as a resource for simultaneously transmitting the SR and the ACK/NACK signal. Information on the scheduling request resource may be predetermined between a BS and a UE or may be reported by the BS to the UE.

SR-related data can be transmitted together with the SR. For example, when coherent detection is used and the SR is defined with 1 bit, if 2-bit transmission is achieved through quadrature phase shift keying (QPSK) modulation, the additional 1 bit can be assigned to the SR-related data. When the SR is detected using non-coherent detection, QPSK-modulated 2-bits can be assigned to the SR-related data.

In the path (2), the SR and the ACK/NACK signal are simultaneously transmitted. The ACK/NACK signal is transmitted on a scheduling request channel which is configured for a scheduling request resource allocated to transmit the SR. The BS can detect the SR by using non-coherent detection. The BS can detect the ACK/NACK signal by using coherent detection. That is, according to a presence/absence of transmission of the scheduling request channel, the BS can know whether the SR is transmitted. Further, the BS can receive the ACK/NACK signal by detecting information on the scheduling request channel. However, in this case, if the ACK/NACK signal is 1 bit and the QPSK modulation is used, coherent detection can also be used for the SR.

In the path (3), when only the ACK/NACK signal is transmitted, the ACK/NACK signal is transmitted on an ACK/NACK channel which is configured by an ACK/NACK resource for the ACK/NACK signal.

The scheduling request channel using coherent detection can be utilized for additional information transmission by simultaneous transmission with a SR-RS. On the contrary, the scheduling request channel using non-coherent detection can increase channel capability since a reference signal is not required.

The SR is a signal transmitted when it is required by the UE. Transmission of the ACK/NACK signal is predetermined according to transmission of downlink data. Therefore, one UE may simultaneously transmit the SR and the ACK/NACK signal in the same subframe. In this case, a problem arises in that the scheduling request channel for the SR and the ACK/NACK channel for the ACK/NACK signal cannot be simultaneously transmitted in the same subframe in order to maintain the single carrier property.

In a case where the SR and the ACK/NACK signal have to be simultaneously transmitted in the same subframe, the UE spreads and transmits modulation symbols for the ACK/NACK signal through the scheduling request channel assigned with the scheduling request resource for transmission of the SR. The scheduling request channel and the ACK/NACK channel have the same structure except for time-frequency sequences assigned thereto. Therefore, when the UE transmits the ACK/NACK signal by using the scheduling request resource, the BS can know the positive transmission of the SR with the presence of the scheduling request channel. Further, the BS can obtain the ACK/NACK signal by using coherent detection through the scheduling request channel for transmitting timing at which the ACK/NACK signal is transmitted.

Accordingly, existing resources can be utilized without having to reserve additional resources for simultaneously transmitting the SR and the ACK/NACK signal. Therefore, resource efficiency can be enhanced.

Figure 10:
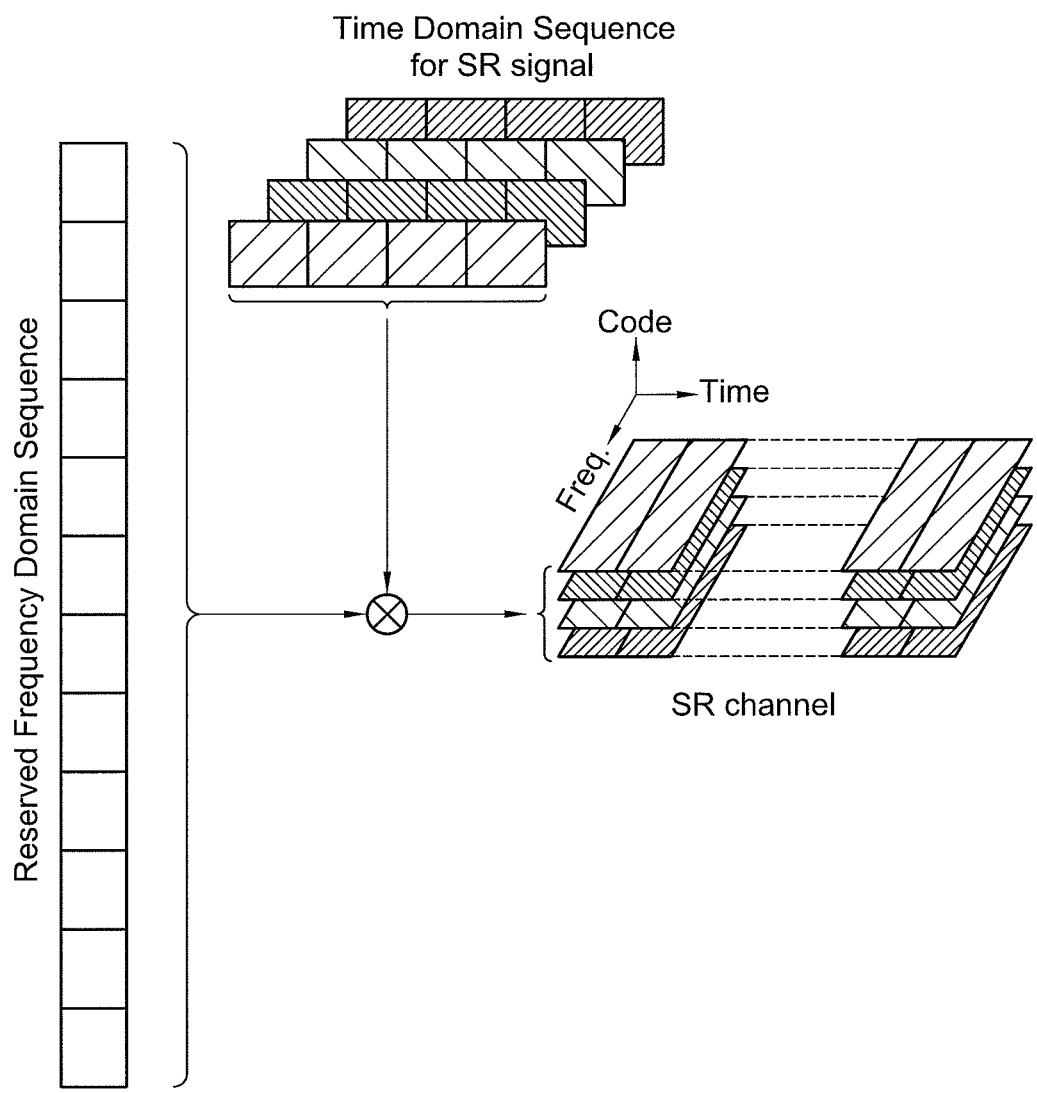
FIG. 10 shows an example of a configuration of a scheduling request channel for non-coherent detection according to an embodiment of the present invention.

FIG. 10 shows an example of a configuration of a scheduling request channel for non-coherent detection according to an embodiment of the present invention.

Referring to FIG. 10, at least one of frequency domain sequences (or frequency domain spreading codes) assigned to an ACK/NACK channel is reserved with a scheduling request resource for a SR. A ZC sequence may be used for the frequency domain sequence. One cyclic shift may be reserved to be used for the SR.

For compatibility with the existing ACK/NACK channel structure, the scheduling request channel is configured by allowing the SR to use a time domain sequence having a length of 4. Unlike coherent detection, the number of supportable scheduling request channels is determined by a length of a time domain sequence used for the SR. Since a time domain sequence having a length of 4 is used for a cyclic shift of one ZC sequence, four scheduling request channels can be generated. If it is assumed that coherent demodulation is used, the number of ACK/NACK channels decreases differently depending on the number of orthogonal spreading sequences for a reference signal and the number of orthogonal spreading sequences for the ACK/NACK signal.

Even if a frequency or time domain sequence is not reserved to generate a scheduling request channel, the number of time domain sequences for the ACK/NACK signal is basically different from the number of time domain sequences for the reference signal. Therefore, time domain sequences not used by the ACK/NACK signal can be used as scheduling request resources. Six scheduling request channels can be generated by using six cyclic shifts.

Table 4 shows the number of scheduling request channels and the number of ACK/NACK channels according to the number of reserved frequency domain sequences.

TABLE 4

| The number of reserved frequency domain sequence | The number of SR channels without SR-RS | The number of ACK/NACK channels |
|---|---|---|
| 0 | 6 | 18 |
| 1 | 6 | 18 |
| 2 | 8 | 16 |
| 3 | 12 | 12 |
| ... | ... | ... |
| 6 | 24 | 0 |

The UE transmits a scheduling request channel through reserved frequency domain spreading and time domain spreading. Upon receiving the scheduling request channel, the BS can detect the SR by using non-coherent detection.

Even when the SR and the ACK/NACK signal are simultaneously transmitted, the BS can detect the SR by using non-coherent detection. The BS can detect the ACK/NACK signal by using coherent detection by utilizing a result of channel estimation using the reference signal for the ACK/NACK signal.

Figure 11:
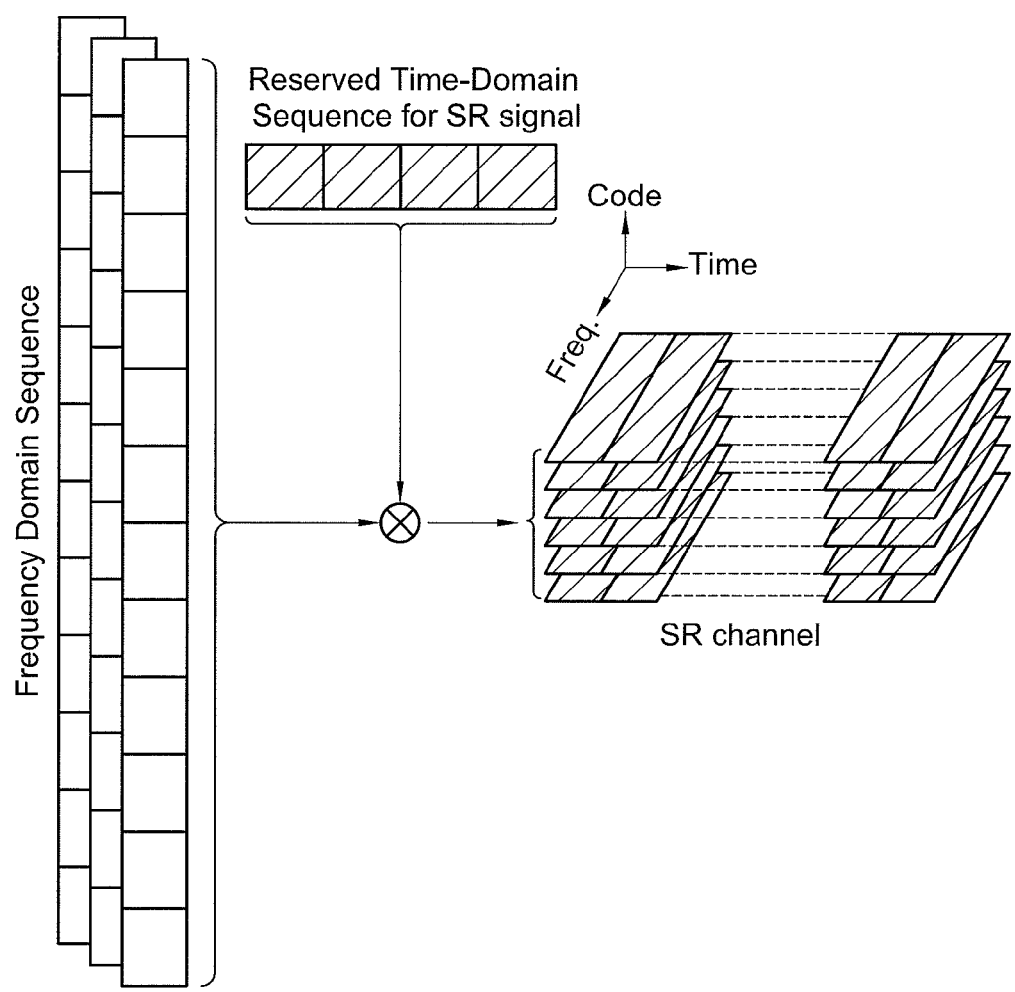
FIG. 11 shows an example of a configuration of a scheduling request channel for non-coherent detection according to another embodiment of the present invention.

FIG. 11 shows an example of a configuration of a scheduling request channel for non-coherent detection according to another embodiment of the present invention.

Referring to FIG. 11, at least one of time domain sequences assigned to the ACK/NACK channel is reserved with a scheduling request resource for a SR. For compatibility with the existing ACK/NACK channel structure, a time domain sequence having a length of 4 is used for the SR.

If one time domain sequence is assigned with the scheduling request resource, the number of scheduling request channels to be generated is the same as the number of available cyclic shifts of one base sequence. For example, if six cyclic shifts are possible for one base sequence, six scheduling request channels can be generated. In this case, since a redundant time domain sequence can be used among the time domain sequences, the number of ACK/NACK channels does not decrease. If two or more time domain sequences are assigned to the scheduling request channel, the number of ACK/NACK channels decreases by 6.

Table 5 shows the number of scheduling request channels and the number of ACK/NACK channels according to the number of reserved time domain sequences.

TABLE 5

| The number of reserved time domain sequence | The number of SR channels without SR-RS | The number of ACK/NACK channels |
|---|---|---|
| 0 | 6 | 18 |
| 1 | 6 | 18 |
| 2 | 12 | 12 |
| 3 | 18 | 6 |
| 4 | 24 | 0 |

The UE transmits a scheduling request channel through frequency domain spreading and reserved time domain spreading. Upon receiving the scheduling request channel, the BS can detect the SR by using non-coherent detection.

Even when the SR and the ACK/NACK signal are simultaneously transmitted, the BS can detect the SR by using non-coherent detection. The BS can detect the ACK/NACK signal by using coherent detection by utilizing a result of channel estimation using a reference signal for the ACK/NACK signal.

Figure 12:
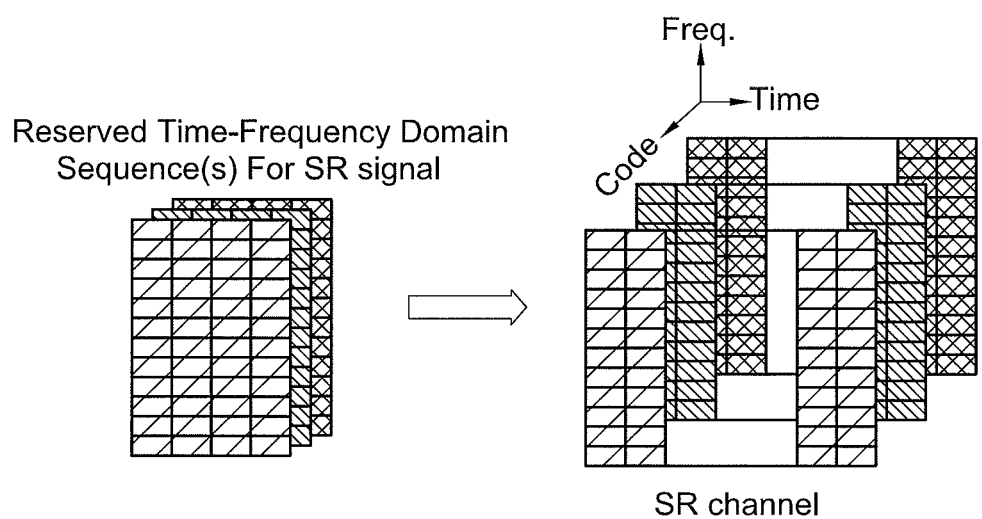
FIG. 12 shows an example of a configuration of a scheduling request channel for non-coherent detection according to another embodiment of the present invention.

FIG. 12 shows an example of a configuration of a scheduling request channel for non-coherent detection according to another embodiment of the present invention.

Referring to FIG. 12, a time-frequency domain sequence is reserved with a scheduling request resource.

The number of supportable scheduling request channel is one-to-one mapped to an assigned time-frequency domain sequence. A time-frequency domain sequence used for the ACK/NACK channel may be utilized to configure the scheduling request channel. In this case, it is assumed that six orthogonal sequences can be generated for one base sequence through cyclic shifts. If six cyclic shifts and one time domain sequence are assigned with the scheduling request resource, six scheduling request channels can be obtained. In this case, if one of orthogonal sequences for the SR and having a length of 4 is utilized, a total number (i.e., 18) of the existing ACK/NACK channels can be maintained without change.

Table 6 shows the number of scheduling request channels and the number of ACK/NACK channels according to the number of assigned time-frequency domain sequences.

TABLE 6

| The number of reserved time-frequency domain sequence | The number of SR channels without SR-RS | The number of ACK/NACK channels |
|---|---|---|
| 0~6 | 6 | 18 |
| 7 | 7 | 17 |
| 8 | 8 | 16 |
| ... | ... | ... |
| 24 | 24 | 0 |

The UE transmits a scheduling request channel by using two-dimensional spreading. Upon receiving the scheduling request channel, the BS can detect the SR by using coherent detection or non-coherent detection.

Even when the SR and the ACK/NACK signal are simultaneously transmitted, orthogonality is maintained between the SR and an ACK/NACK signal. Thus, the BS can detect the SR and the ACK/NACK signal. The BS can detect the SR by using non-coherent detection. The BS can detect the ACK/

NACK signal by using coherent detection by utilizing a result of channel estimation using a reference signal for the ACK/NACK signal.

Figure 13:
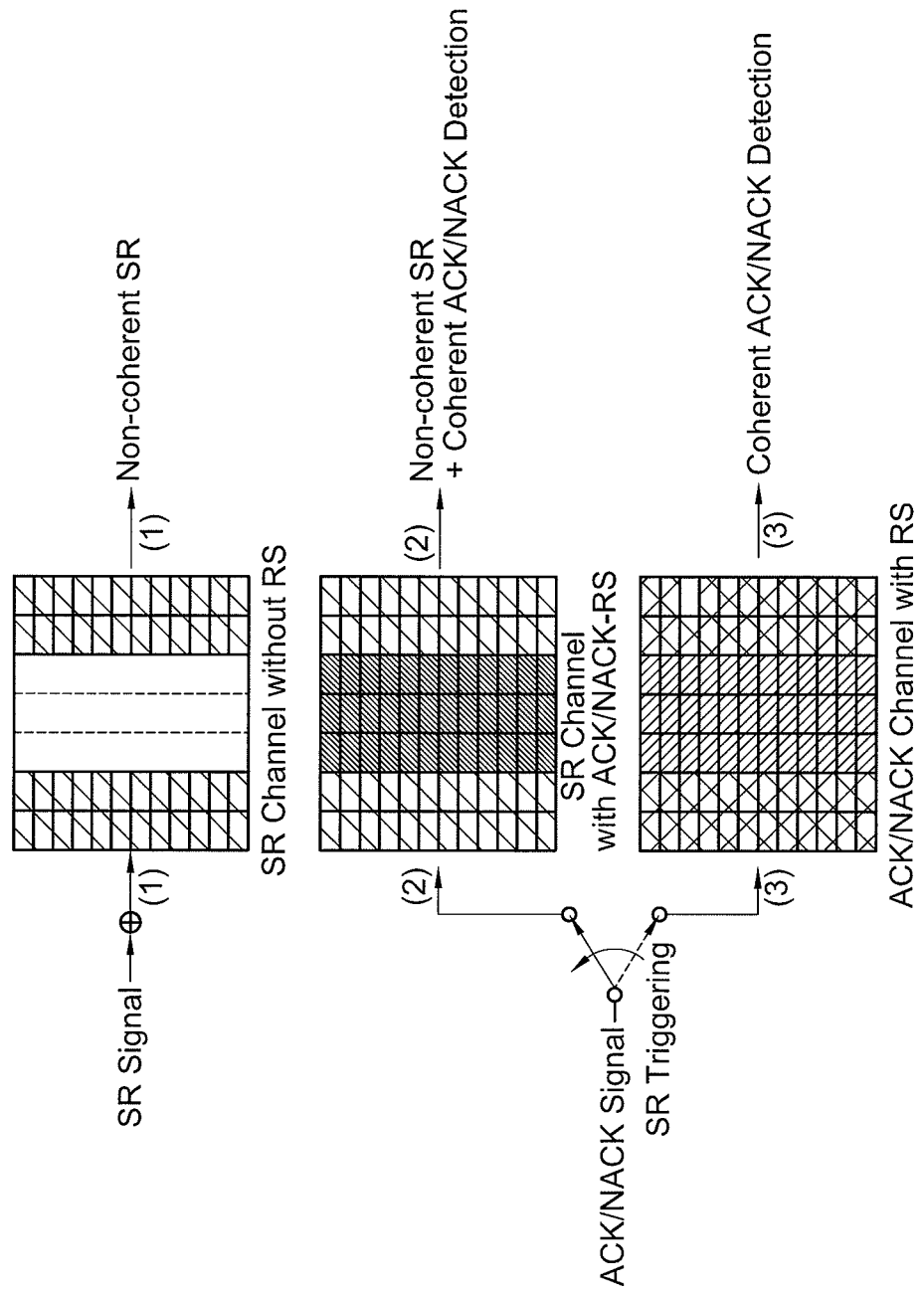
FIG. 13 shows an example of transmission of a scheduling request.

FIG. 13 shows an example of transmission of a SR.

Referring to FIG. 13, a path (1) denotes transmission of the SR. A path (2) denotes simultaneous transmission of the SR and an ACK/NACK signal. A path (3) denotes transmission of the ACK/NACK signal.

In the path (1), the SR is transmitted on a scheduling request channel. Unlike coherent detection, it is difficult to transmit additional SR-related information together with the SR. However, the scheduling request channel can be configured without decreasing capability of the existing ACK/NACK channel.

In the path (2), the SR and the ACK/NACK signal can be simultaneously transmitted. Regarding a reference signal (RS), a RS assigned to the ACK/NACK channel is used. The ACK/NACK signal (e.g., a QPSK symbol) is transmitted on a scheduling request channel assigned to a scheduling request resource allocated for the SR. A BS can detect the SR by using non-coherent detection. The BS can detect the ACK/NACK signal by using coherent detection. In this case, if the ACK/NACK signal is 1 bit and the QPSK modulation is used, coherent detection can also be used for the SR.

In path (3), when only the ACK/NACK signal is transmitted, the ACK/NACK signal is transmitted on an ACK/NACK channel.

By allowing the uplink control channel for transmitting only one control signal (e.g., the ACK/NACK signal or the SR) to have the same structure as an uplink control channel for simultaneously transmitting the ACK/NACK signal and the SR, additional channel configurations are not necessary, and resources can be effectively used.

Figure 14:
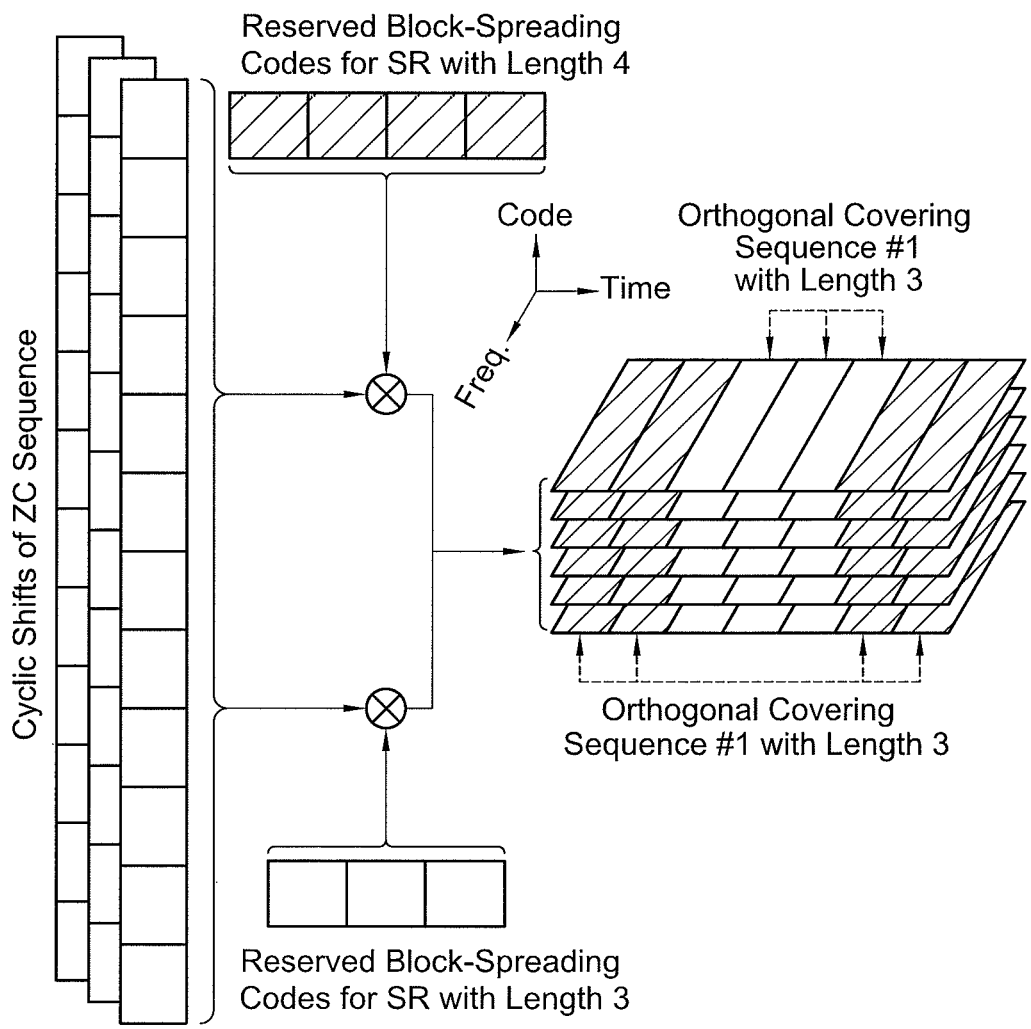
FIG. 14 shows an example of a configuration of a scheduling request channel according to an embodiment of the present invention.

FIG. 14 shows an example of a configuration of a scheduling request channel according to an embodiment of the present invention. The scheduling request channel has a structure in which resources of a reference signal are not allocated.

Referring to FIG. 14, in one slot, a time domain sequence having a length of 7 is split to use two time domain sequences having a length of 3 and 4, respectively. The time domain sequence having a length of 3 is used in a portion corresponding to a reference signal of the existing ACK/NACK channel. The time domain sequence having a length of 4 is used in a portion corresponding to an ACK/NACK signal of the existing ACK/NACK channel.

In a case where a time domain sequence having a length of 7 is arbitrarily configured when a SR is transmitted, it is difficult for the scheduling request channel to exist within a time-frequency resource which is the same as that of the existing ACK/NACK channel. Further, a frequency domain sequence has to be dedicatedly assigned for the SR, which is burdensome. For example, if a ZC sequence is used as the frequency domain sequence, a dedicated scheduling request channel has to be configured using a specific cyclic shift.

Accordingly, when the time domain sequence having a length of 7 is split and used, the SR can be modulated with on-off keying. For a detection scheme, both coherent detection and non-coherent detection can be supported.

Figure 15:
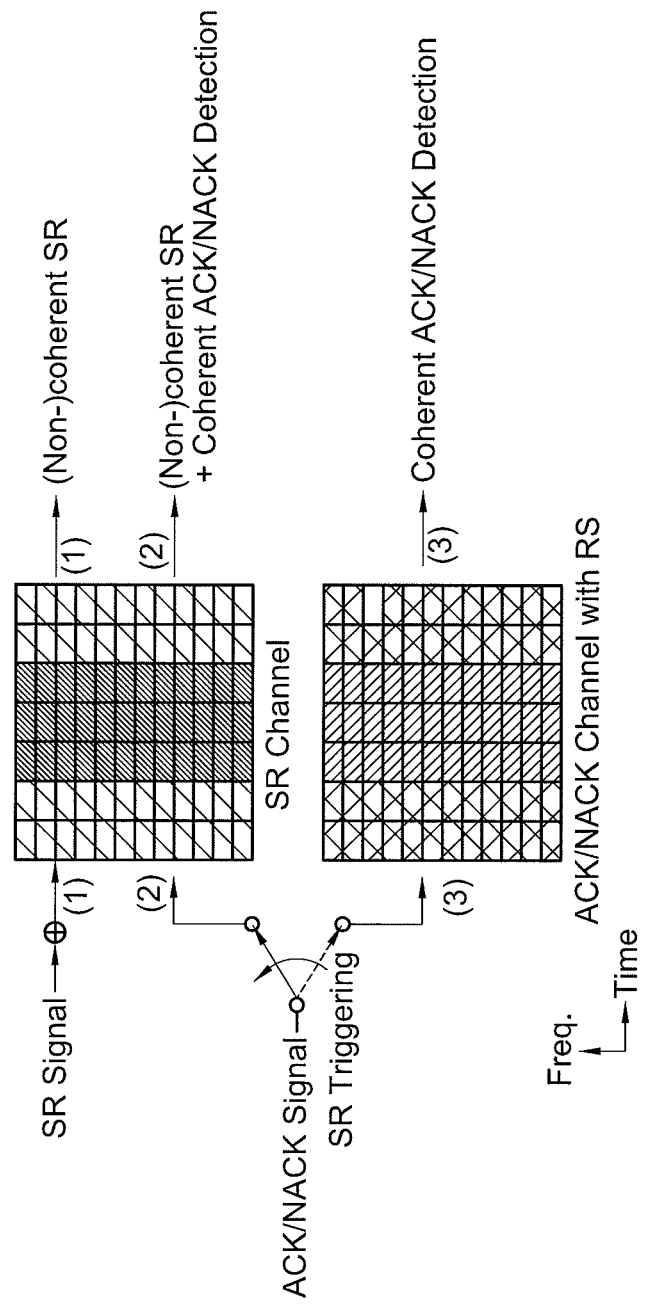
FIG. 15 shows an example of transmission of a scheduling request.

FIG. 15 shows an example of transmission of a SR.

Referring to FIG. 15, in a path (1), the SR is transmitted on a scheduling request channel configured with a scheduling request resource. Both coherent detection and non-coherent detection can be supported in the transmission of the SR. If only the SR is transmitted, the SR is transmitted on the scheduling request channel assigned with the scheduling request resource. The scheduling request resource can be regarded as a resource for the SR. When considering a path (2), the scheduling request resource can be regarded as a resource for simultaneously transmitting the SR and the ACK/NACK signal. Information on the scheduling request resource may be predetermined between a BS and a UE or may be reported by the BS to the UE.

In the path (2), when the SR and the ACK/NACK signal are simultaneously transmitted in the same subframe, the ACK/NACK signal is transmitted on a scheduling request channel configured with the scheduling request resource. In this case, since a sequence for the SR and having a length of 3 is assigned, a reference signal for coherent detection of the ACK/NACK signal can be used for the sequence assigned to the SR without change. Eventually, the ACK/NACK signal is transmitted by being carried on the scheduling request resource allocated to the SR.

In a path (3), if only the ACK/NACK signal is transmitted, the ACK/NACK signal is transmitted on the ACK/NACK channel.

In a case where the SR and the ACK/NACK signal have to be simultaneously transmitted in the same subframe, the UE spreads and transmits modulation symbols for the ACK/NACK signal through an uplink control channel configured with the scheduling request resource for transmission of the SR. The scheduling request channel and the ACK/NACK channel are allocated with different resources but have the same uplink control channel structure. Therefore, when the UE transmits the ACK/NACK signal by using the scheduling request resource, the BS can know the positive transmission of the SR with the presence of the scheduling request channel. Further, the BS can obtain the ACK/NACK signal by using coherent detection with the scheduling request resource for transmitting timing at which the ACK/NACK signal is transmitted. If only the ACK/NACK signal needs to be transmitted, the UE transmits the ACK/NACK signal through the uplink control channel configured with the ACK/NACK resource for the ACK/NACK signal.

Accordingly, existing resources can be utilized without having to reserve additional resources for simultaneously transmitting the SR and the ACK/NACK signal. Therefore, resource efficiency can be enhanced.

Meanwhile, in a case where a dedicated scheduling request channel is transmitted using a dedicated scheduling request resource without consideration of coexistence with the ACK/NACK channel, capability of the scheduling request channel is problematic. For example, if non-coherent detection is used in one resource block (RB) and one subframe, a maximum of 42 scheduling request channels can be generated through two-dimensional spreading. Therefore, if it is assumed that the existing ACK/NACK channel and the scheduling request channel do not coexist, to transmit the SR through the ACK/NACK channel, there is a need for a method capable of transmitting additional 1-bit information through the existing ACK/NACK channel.

An additional 1-bit SR can be transmitted through QPSK modulation when the ACK/NACK signal is 1 bit. The SR can be transmitted by changing a phase or sequence of the ACK/NACK signal carried on a pair of slots.

Figure 16:
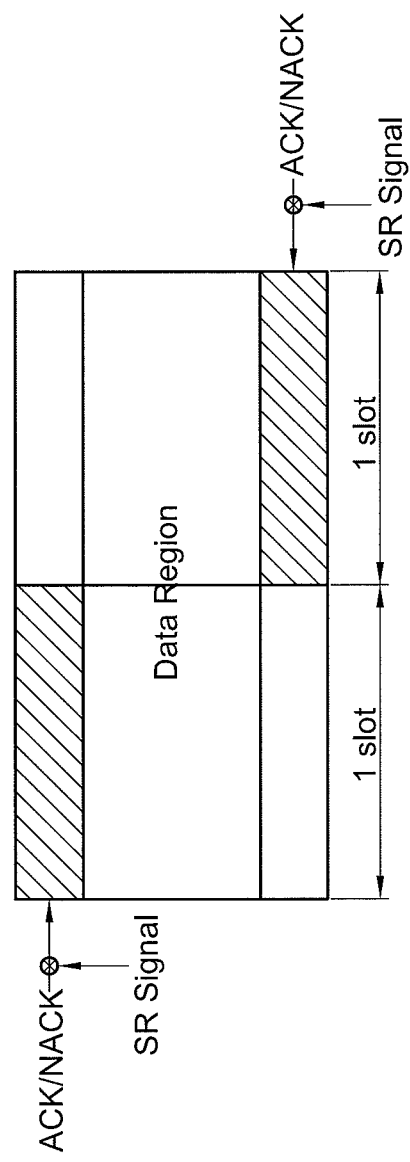
FIG. 16 shows an example of transmission of a scheduling request of slot-based hopping.

FIG. 16 shows an example of transmission of a SR of slot-based hopping.

Referring to FIG. 16, when there is no data transmission, an uplink control channel is transmitted using a control region defined at both ends of a slot. In this case, a frequency diversity gain is provided through slot-unit hopping. In case of the existing ACK/NACK channel, the same ACK/NACK signal is transmitted in a slot unit. Thus, the SR can be transmitted by changing a phase or sequence of the ACK/NACK signal carried on two slots.

In a condition that transmission of the SR is requested, a transmitter may transmit the SR by multiplying a predetermined phase variation or orthogonal sequence or by carrying a specific modulation signal at a portion where the ACK/NACK signal is carried in every slot (i.e., a specific one slot or more slots). The transmitter may transmit the SR by using a differential modulation scheme. A receiver can detect the SR after the ACK/NACK signal is demodulated in a slot unit. Either coherent detection or non-coherent detection can be used to detect the SR.

Figure 17:
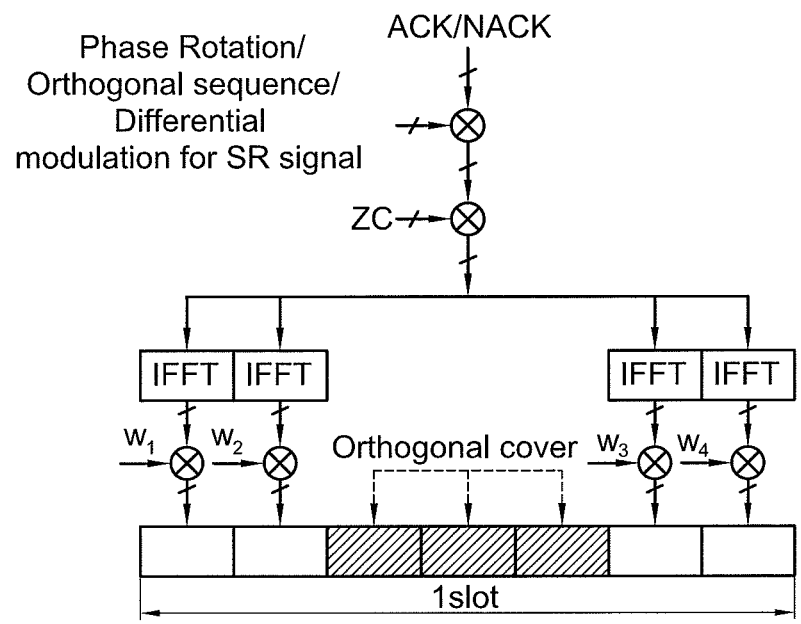
FIG. 17 shows an example of a slot structure for transmitting a scheduling request.

FIG. 17 shows an example of a slot structure for transmitting a SR. To carry the SR together with an ACK/NACK signal, the ACK/NACK signal undergoes phase shift, orthogonal spreading sequence and/or differential modulation.

The present invention can be implemented with hardware, software or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of transmitting uplink control signals in a wireless communication system, the method comprising:
    reserving a preassigned scheduling request (SR) physical uplink control channel (PUCCH) resource used for transmission of a SR;
    determining a frequency domain sequence and an orthogonal sequence based on the preassigned SR PUCCH resource;
    spreading an ACK/NACK for Hybrid Automatic Repeat Request (HARQ) with the frequency domain sequence and the orthogonal sequence to generate a mapped sequence; and
    transmitting the mapped sequence.

2. The method of claim 1, wherein the mapped sequence is transmitted in a subframe, the subframe comprising two slots, each slot including a plurality of Orthogonal Frequency Division Multiplexing (OFDM) symbols.

3. The method of claim 1, wherein the SR is indicated by one of a positive and a negative transmission, the positive transmission being a presence of a SR transmission and the negative transmission being an absence of the SR transmission.

4. The method claim 1, wherein the frequency domain sequence is determined by cyclically shifting a base sequence with a cyclic shift which is obtained from the preassigned SR PUCCH resource.

5. A mobile communication apparatus configured to transmit uplink control signals in a wireless communication system, the mobile communication apparatus comprising a transmitter configured for:
    reserving a preassigned scheduling request (SR) physical uplink control channel (PUCCH) resource used for transmission of a SR;
    determining a frequency domain sequence and an orthogonal sequence based on the preassigned SR PUCCH resource;
    spreading an ACK/NACK for Hybrid Automatic Repeat Request (HARQ) with the frequency domain sequence and the orthogonal sequence to generate a mapped sequence; and
    transmitting the mapped sequence.

6. The mobile communication apparatus of claim 5, wherein the mapped sequence is transmitted in a subframe, the subframe comprising two slots, each slot including a plurality of Orthogonal Frequency Division Multiplexing (OFDM) symbols.

7. The mobile communication apparatus of claim 5, wherein the SR is indicated by one of a positive and a negative transmission, the positive transmission being a presence of a SR transmission and the negative transmission being an absence of the SR transmission.

8. The mobile communication apparatus of claim 5, wherein the frequency domain sequence is determined by cyclically shifting a base sequence with a cyclic shift which is obtained from the preassigned SR PUCCH resource.

* * * * *